(12) United States Patent
Wang

(10) Patent No.: US 11,989,335 B2
(45) Date of Patent: May 21, 2024

(54) PROCESSING CIRCUIT AND PROCESSING METHOD THEREOF

(71) Applicant: Nuvoton Technology Corporation, Hsinchu (TW)

(72) Inventor: Cheng-Chih Wang, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 678 days.

(21) Appl. No.: 17/137,963

(22) Filed: Dec. 30, 2020

(65) Prior Publication Data

US 2021/0406408 A1  Dec. 30, 2021

(30) Foreign Application Priority Data

Jun. 24, 2020  (TW) .................................. 109121499

(51) Int. Cl.
*G06F 21/00* (2013.01)
*G06F 1/06* (2006.01)
(Continued)

(52) U.S. Cl.
CPC .............. *G06F 21/755* (2017.08); *G06F 1/06* (2013.01); *G06F 1/08* (2013.01); *H03K 21/08* (2013.01)

(58) Field of Classification Search
CPC .. H03K 21/08; G06F 1/08; G06F 1/06; G06F 21/755
(Continued)

(56) References Cited

U.S. PATENT DOCUMENTS 8,970,247 B2 * 3/2015 Oomura .................. G06F 21/87
324/762.03
9,998,124 B2 * 6/2018 Calhoun ............... G06F 1/3296
(Continued)

FOREIGN PATENT DOCUMENTS

TW        201202961 A    1/2012
TW        201407339 A    2/2014
(Continued)

OTHER PUBLICATIONS

Office Action dated Aug. 3, 2021 in TW Application No. 109121499, 4 pages.

*Primary Examiner* — Josnel Jeudy
(74) *Attorney, Agent, or Firm* — Muncy, Geissler, Olds & Lowe, P.C.

(57) ABSTRACT

A processing circuit including a first oscillation circuit, a second oscillation circuit, a counting circuit, and a control circuit is provided. The first oscillation circuit receives an input voltage and generates a first clock signal according to the input voltage. The second oscillation circuit receives an output voltage and generates a second clock signal according to the output voltage. The counting circuit receives the output voltage. The counting circuit adjusts a first counter value according to the first clock signal and adjusts a second counter value according to the second clock signal. The control circuit receives the output voltage and determines whether the input voltage is experiencing an attack according to the first counter value and the second counter value. The first oscillation circuit operates in an un-protected power domain. The second oscillation circuit, the counting circuit, and the control circuit operate in a protected power domain.

20 Claims, 5 Drawing Sheets

(51) Int. Cl.
*G06F 1/08* (2006.01)
*G06F 21/75* (2013.01)
*H03K 21/08* (2006.01)

(58) Field of Classification Search
USPC .......................................................... 726/23
See application file for complete search history.

(56) References Cited

U.S. PATENT DOCUMENTS

| | | | |
|---|---|---|---|
| 2004/0128528 A1* | 7/2004 | Poisner | G06F 21/725 726/22 |
| 2006/0176040 A1* | 8/2006 | Kernahan | G06F 1/3203 323/299 |
| 2008/0189557 A1 | 8/2008 | Pipitone et al. | |
| 2011/0040817 A1 | 2/2011 | Lazich et al. | |
| 2015/0338866 A1* | 11/2015 | Hu | G05F 1/575 323/280 |
| 2016/0087641 A1* | 3/2016 | Familia | H03L 7/099 331/8 |
| 2017/0032125 A1* | 2/2017 | Lee | G08B 21/18 |
| 2017/0077808 A1* | 3/2017 | Iwai | H03M 9/00 |
| 2018/0164351 A1* | 6/2018 | Nirwan | H03K 5/1534 |
| 2018/0225230 A1 | 8/2018 | Litichever et al. | |
| 2019/0087359 A1 | 3/2019 | Litichever et al. | |
| 2020/0393869 A1* | 12/2020 | August | G06F 1/12 |

FOREIGN PATENT DOCUMENTS

| | | |
|---|---|---|
| TW | 201428478 A | 7/2014 |
| TW | 201544946 A | 12/2015 |
| TW | 201828076 A | 8/2018 |
| TW | 202011657 A | 3/2020 |

\* cited by examiner

PROCESSING CIRCUIT AND PROCESSING METHOD THEREOF

CROSS REFERENCE TO RELATED APPLICATIONS

This application claims priority of Taiwan Patent Application No. 109121499, filed on Jun. 24, 2020, the entirety of which is incorporated by reference herein.

BACKGROUND OF THE INVENTION

Field of the Invention

The invention relates to a processing circuit, and more particularly to a processing circuit that determines whether the input voltage is experiencing a power glitch.

Description of the Related Art

A power-glitch attack is a common method of stealing data. After a chip with security protection is experiencing a power glitch, a security protection function in the chip is released, and then the important data in the chip can be stolen.

BRIEF SUMMARY OF THE INVENTION

In accordance with an embodiment of the disclosure, a processing circuit comprises a first oscillation circuit, a second oscillation circuit, a counting circuit, and a control circuit. The first oscillation circuit receives an input voltage and generates a first clock signal according to the input voltage. The second oscillation circuit receives an output voltage and generates a second clock signal according to the output voltage. The counting circuit receives the output voltage. The counting circuit adjusts a first counter value according to the first clock signal and adjusts a second counter value according to the second clock signal. The control circuit receives the output voltage and determines whether the input voltage is experiencing an attack according to the first counter value and the second counter value. The first oscillation circuit operates in an un-protected power domain. The second oscillation circuit, the counting circuit, and the control circuit operate in a protected power domain.

In accordance with a further embodiment of the disclosure, a processing method of operating a processing circuit comprises providing an input voltage to a first oscillation circuit to generate a first clock signal; providing an output voltage to a second oscillation circuit to generate a second clock signal; adjusting a first counter value according to the first clock signal; adjusting a second counter value according to the second clock signal; and determining whether the input voltage is experiencing an attack according to the first counter value and the second counter value.

Processing methods may be practiced by a system which have hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
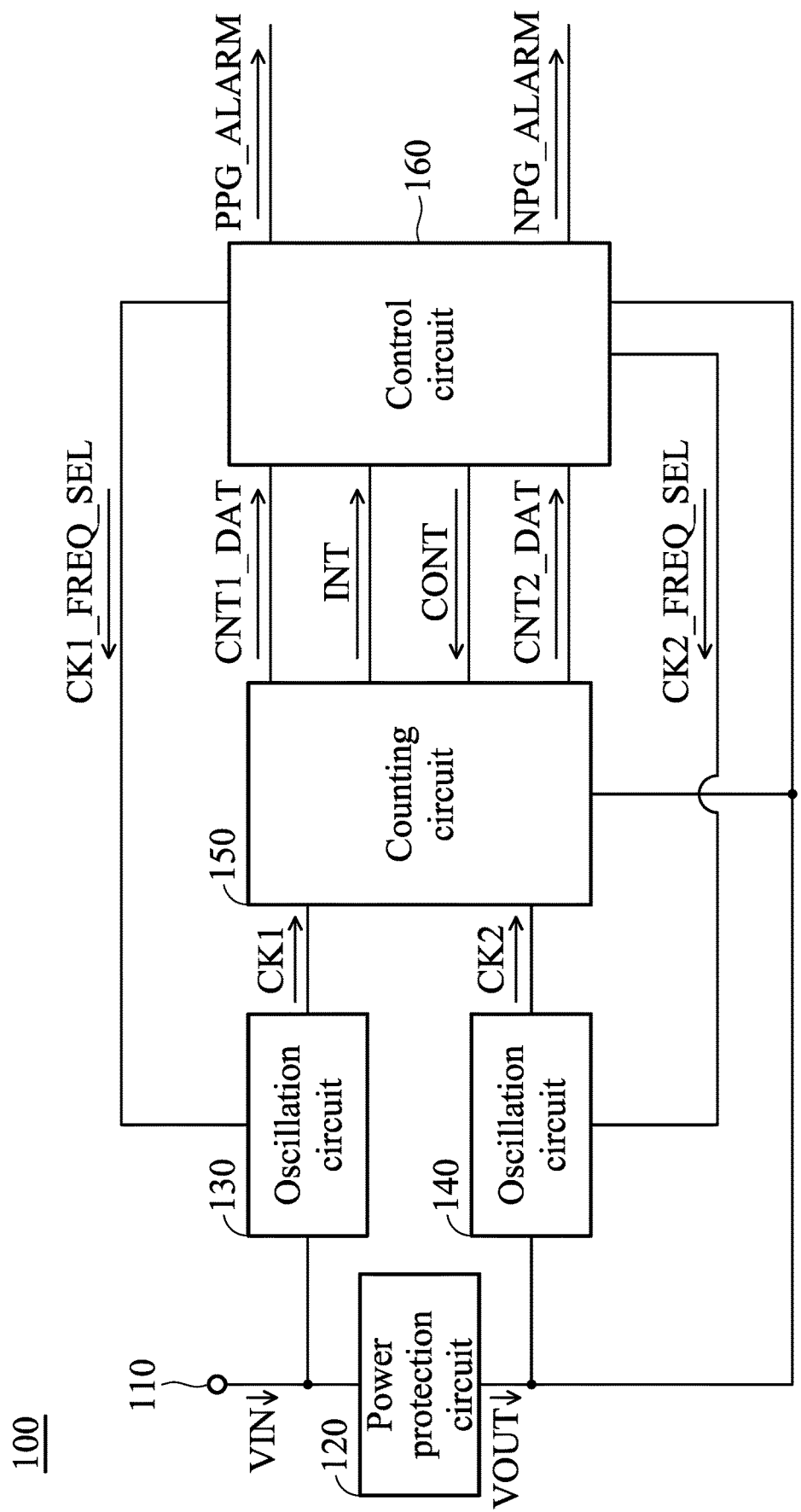
FIG. 1 is a schematic diagram of an exemplary embodiment of a processing circuit, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a processing circuit, according to various aspects of the present disclosure. As shown in FIG. 1, the processing circuit 100 comprises a power terminal 110 configured to receive an input voltage VIN. In one embodiment, the power terminal 110 serves as an input/output pin of the processing circuit 100 to receive external power (e.g., VIN). In this embodiment, the processing circuit 100 comprises oscillation circuits 130 and 140, a counting circuit 150, and a control circuit 160.

The oscillation circuit 130 receives an input voltage VIN and generates a clock signal CK1 according to the input voltage VIN. In this embodiment, with change of the input voltage VIN, the frequency of the clock signal CK1 is changed. For example, with increase of the input voltage VIN, the frequency of the clock signal CK1 may be increased or reduced. With decrease of the input voltage VIN, the frequency of the clock signal CK1 may be reduced or increased. The structure of oscillation circuit 130 is not limited in the present disclosure. Any circuit can serve as the oscillation circuit 130, as long as that circuit is capable of adjusting the frequency of an output clock according to an input voltage. In one embodiment, the oscillation circuit 130 is a ring oscillator. In other embodiments, the oscillation circuit 130 is a voltage-controlled oscillator (VCO).

The oscillation circuit 140 receives an output voltage VOUT and generates a clock signal CK2 according to the output voltage VOUT. Since the characteristic of the oscillation circuit 140 is similar to the characteristic of the oscillation circuit 130, the related description is omitted here. In this embodiment, a difference between the oscillation circuits 130 and 140 is that the output voltage VOUT received by the oscillation circuit 140 is a protected power and the input voltage VIN received by the oscillation circuit 130 is an un-protected power.

The counting circuit 150 receives the output voltage VOUT. In this embodiment, the output voltage VOUT serves as the operation voltage of the counting circuit 150. After receiving the output voltage VOUT, the counting circuit 150 adjusts a counter value CNT1_DAT according to the clock signal CK1 and adjusts another counter value CNT2_DAT according to the clock signal CK2. Since the output voltage VOUT is protected, when the input voltage VIN is experiencing a power-glitch attack, the counting operation performed by the counting circuit 150 does not be interfered by the input voltage VIN experiencing the attack.

The control circuit 160 receives the output voltage VOUT. In this embodiment, the output voltage VOUT serves as the operation voltage of the control circuit 160. After receiving the output voltage VOUT, the control circuit 160 determines whether the input voltage VIN is experiencing a power-glitch attack according to the counter values CNT1_DAT and CNT2_DAT. In one embodiment, when the counter value CNT1_DAT is different from the counter value CNT2_DAT, this indicates that the input voltage VIN is experiencing a power glitch. For example, when the counter value CNT1_DAT is higher than the counter value CNT2_DAT, this means that the input voltage VIN has changed (e.g., to be increased) due to the power glitch. Therefore, the control circuit 160 asserts a warning signal PPG_ALARM. When the counter value CNT1_DAT is lower than the counter value CNT2_DAT, this means that the input voltage VIN may be reduced due to the power glitch. Therefore, the control circuit 160 asserts another warning signal NPG_ALARM. In other embodiments, the control circuit 160 asserts a single warning signal. In such cases, each time the counter value CNT1_DAT is different from the counter value CNT2_DAT, the control circuit 160 asserts a single warning signal.

In other embodiments, the processing circuit 100 further comprises a power protection circuit 120. The power protection circuit 120 adjusts the input voltage VIN to generate the output voltage VOUT. In one embodiment, the power protection circuit 120 adjusts the input voltage VIN to increase or reduce the input voltage VIN and provides the adjusted input voltage VIN as the output voltage VOUT. The structure of the power protection circuit 120 is not limited in the present disclosure. Any circuit can serve as the power protection circuit 120, as long as the circuit is capable of adjusting the input voltage VIN. In one embodiment, the power protection circuit 120 is a linear regulator, such as a low dropout linear regulator. In such cases, since the lower dropout linear regulator does not use an external capacitor to stabilize the output voltage VOUT, even though a power-glitch attack affects the input voltage VIN, the output voltage VOUT generated by the lower dropout linear regulator is not changed. In this embodiment, the output voltage VOUT is a protected power. The security of the output voltage VOUT is higher than the security of the input voltage VIN.

In some embodiments, when the input voltage VIN experiences a power-glitch attack, the control circuit 160 changes the value of at least one flag, such as from a value of 0 to a value of 1. In such cases, a tamper event management unit performs a specific operation according to the value of the flag. In one embodiment, the tamper event management unit may immediately stop operating the processing circuit 100. In another embodiment, the tamper event management unit records the number of times the value of the flag is changed from 0 to 1. In such case, the tamper event management unit sets the value of the flag to a value of 1 from a value of 0. When the input voltage VIN experiences an attack again, the control circuit 160 changes the value of the flag, such as from the value 0 to the value 1 again. In one embodiment, when the number of times the input voltage VIN experiences an attack reaches an upper limit, the tamper event manage- ment unit may disable the processing circuit 100 so that the processing circuit 100 directs the power protection circuit 120 to stop providing the output voltage VOUT.

In other embodiments, the control circuit 160 sets the initial frequency of the clock signal CK1 and the initial frequency of the clock signal CK2. In such cases, the initial frequency of the clock signal CK1 is the same as the initial frequency of the clock signal CK2. The disclosure does not limit how the control circuit 160 sets the initial frequency of the clock signal CK1 and the initial frequency of the clock signal CK2. In one embodiment, the control circuit 160 generates a set signal CK1_FREQ_SEL. The control circuit 160 sends the set signal CK1_FREQ_SEL to the oscillation circuit 130 to set the initial frequency of the clock signal CK1, such as 100 MHz. Furthermore, the control circuit 160 further generates another set signal CK2_FREQ_SEL and sends the set signal CK2_FREQ_SEL to the oscillation circuit 140 to set the initial frequency of the clock signal CK2, such as 100 MHz. Since the initial frequency of the clock signal CK1 is the same as the initial frequency of the clock signal CK2, the counter value CNT1_DAT should be equal to the counter value CNT2_DAT in normal conditions. However, when the input voltage VIN is affected by any attacks, the frequency of the clock signal CK1 is also changed. At this time, since the frequency of the clock signal CK1 is not maintained to the initial frequency, the counter value CNT1_DAT is different from the counter value CNT2_DAT. Therefore, the control circuit 160 obtains that the input voltage VIN experiences an attack.

In one embodiment, when the counter value CNT1_DAT or the counter value CNT2_DAT reaches a predetermined value, the counting circuit 150 asserts an interrupt signal INT so that the control circuit 160 reads the counter value CNT1_DAT and the counter value CNT2_DAT. The control circuit 160 operates according to the counter value CNT1_DAT and the counter value CNT2_DAT. For example, when the interrupt signal INT is asserted, the control circuit 160 generates a control signal CONT to disable the counting circuit 150. Therefore, the counting circuit 150 stops adjusting the counter value CNT1_DAT and the counter value CNT2_DAT. In one embodiment, when the interrupt signal INT is asserted, the control circuit 160 sends the set signals CK1_FREQ_SEL and CK2_FREQ_SEL to direct the oscillation circuits 130 and 140 to stop generating the clock signals CK1 and CK2. Therefore, the counting circuit 150 stops adjusting the counter value CNT1_DAT and the counter value CNT2_DAT.

In other embodiments, the counting circuit 150 comprises a first counter and a second counter. In such cases, the first counter adjusts the counter value CNT1_DAT according to the clock signal CK1, and the second counter adjusts the counter value CNT2_DAT according to the clock signal CK2. In this embodiment, when the counter value CNT1_DAT is equal to a predetermined value, the first counter enables the interrupt signal INT. When the counter value CNT2_DAT is equal to the predetermined value, the second counter enables the interrupt signal INT.

When the interrupt signal INT is enabled, the control circuit 160 determines whether the counter value CNT1_DAT is higher than the counter value CNT2_DAT. When the counter value CNT1_DAT is higher than the counter value CNT2_DAT, the control circuit 160 enables the warning signal PPG_ALARM. When the counter value CNT1_DAT is lower than the counter value CNT2_DAT, the control circuit 160 enables the warning signal NPG_ALARM. In other embodiments, when the counter value CNT1_DAT is equal to the counter value CNT2_DAT, the control circuit 160 resets the counting circuit 150 via the control signal CONT. Therefore, each of the counter value CNT1_DAT and the counter value CNT2_DAT restores to an initial value, such as the value 0. In such cases, the control circuit 160 uses the control signal CNT to direct the counting circuit 150 so that the counting circuit 150 again adjusts the counter value CNT1_DAT according to the clock signal CK1 and again adjusts the counter value CNT2_DAT according to the clock signal CK2.

The invention does not limit how the control circuit 160 controls the counting circuit 150. In one embodiment, the control circuit 160 uses a single control signal CONT to control the counting circuit 150. In such cases, the counting circuit 150 performs different operations according to the frequency or the voltage level of the control signal CONT. For example, when the control signal CONT is at a first level, the counting circuit 150 resets the counter value CNT1_DAT and the counter value CNT2_DAT. When the control signal CONT is at a second level, the counting circuit 150 stops adjusting the counter value CNT1_DAT and the counter value CNT2_DAT. When the control signal CONT is at a third level, the counting circuit 150 adjusts the counter values CNT1_DAT CNT2_DAT according to the clock signals CK1 and CK2. In other embodiments, the control circuit 160 generates a reset signal, a stop signal and a start signal. In such cases, when the reset signal is asserted, the counting circuit 150 resets the counter values CNT1_DAT and CNT2_DAT. When the stop signal is asserted, the counting circuit 150 stops adjusting the counter values CNT1_DAT and CNT2_DAT. When the start signal is asserted, the counting circuit 150 adjusts the counter value CNT1_DAT according to the clock signal CK1 and adjusts the counter value CNT2_DAT according to the clock signal CK2.

Since the input voltage VIN easily experiences an attack, and since it serves as the operation voltage of the oscillation circuit 130, the oscillation circuit 130 operates in an un-protected power domain. In such cases, since the output voltage VOUT does not change as the input voltage VIN changes, and since the output voltage VOUT serves as the operation voltage of the oscillation circuit 140, the counting circuit 150, and the control circuit 160, the oscillation circuit 140, the counting circuit 150, and the control circuit 160 operate in a protected power domain. When the input voltage VIN experiences a power-glitch attack, the oscillation circuit 140, the counting circuit 150, and the control circuit 160 can operate normally. In one embodiment, the power protection circuit 120, the oscillation circuit 140, the counting circuit 150, and the control circuit 160 are combined into an integrated circuit (IC).

Figure 2:
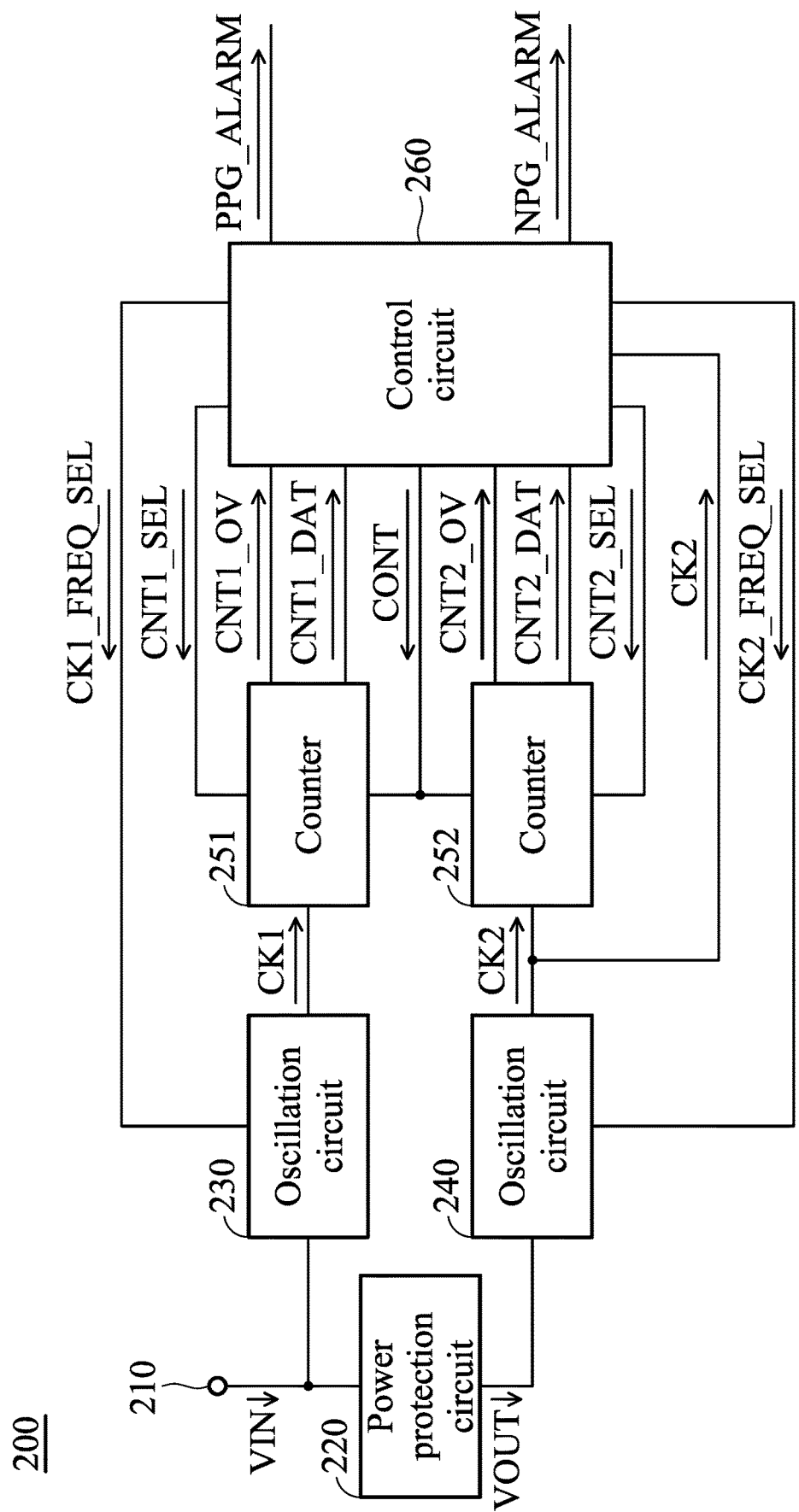
FIG. 2 is a schematic diagram of another exemplary embodiment of the processing circuit, according to various aspects of the present disclosure.

FIG. 2 is a schematic diagram of another exemplary embodiment of the processing circuit, according to various aspects of the present disclosure. The processing circuit 200 comprises a power terminal 210. The power terminal 210 is configured to receive an input voltage VIN. The processing circuit 200 further comprises a power protection circuit 220, oscillation circuits 230 and 240, counters 251 and 252, and a control circuit 260. The power protection circuit 220 adjusts the input voltage VIN to generate an output voltage VOUT. Since the characteristic of the power protection circuit 220 shown in FIG. 2 is similar to the characteristic of the power protection circuit 120 shown in FIG. 1, the related description is omitted here.

The oscillation circuit 230 receives the input voltage VIN and generates a clock signal CK1 according to the input voltage VIN. The oscillation circuit 240 receives the output voltage VOUT and generates a clock signal CK2 according to the output voltage VOUT. Since the characteristics of the oscillation circuit 230 and 240 shown in FIG. 2 are similar to the characteristics of the oscillation circuits 130 and 140 shown in FIG. 1, the related description is omitted here.

The counter 251 adjusts the counter value CNT1_DAT according to the frequency of the clock signal CK1. In this embodiment, when the counter value CNT1_DAT reaches a first predetermined value, the counter 251 asserts an overflow signal CNT1_OV. In one embodiment, the first predetermined value is stored in the counter 251. In such cases, the control circuit 260 sends a set signal CNT1_SEL to the counter 251 to set the first predetermined value.

In one embodiment, the counter 251 comprises a count register (not shown). The count register has 16 bits, but the disclosure is not limited thereto. The count register determines how many bits to use for counting according to the set signal CNT1_SEL. For example, if the count register uses 8 bits to count the number of pulses of the clock signal CK1, the counter value of the count register can reach to 255. In such cases, when the number of pulses of the clock signal CK1 is higher than 255, the count register occurs an overflow event. Therefore, the overflow signal CNT1_OV is asserted.

In this embodiment, the control circuit 260 determines whether to read the counter value CNT1_DAT according to the overflow signal CNT1_OV. For example, when the overflow signal CNT1_OV is asserted, the control circuit 260 reads the counter value CNT1_DAT. At this time, the control circuit 260 also reads the counter value CNT2_DAT. However, when the overflow signal CNT1_OV is not asserted, the control circuit 260 does not read the counter value CNT1_DAT.

The counter 252 adjusts the counter value CNT2_DAT according to the frequency of the clock signal CK2. In this embodiment, when the counter value CNT2_DAT reaches a second predetermined value, the counter 252 asserts an overflow signal CNT2_OV. When the overflow signal CNT2_OV is asserted, the control circuit 260 reads the counter value CNT2_DAT. At this time, the control circuit 260 also reads the counter value CNT1_DAT. However, when the overflow signal CNT2_OV is not asserted, the control circuit 260 does not read the counter value CNT2_DAT. Since the characteristic of the counter 252 is similar to the characteristic of the counter 251, the related description is omitted here.

In other embodiments, when the overflow signal CNT1_OV or CNT2_OV is asserted, the control circuit 260 uses the control signal CONT to direct the counters 251 and 252 to stop adjusting the counter values CNT1_DAT and CNT2_DAT. At this time, the control circuit 260 reads the counter values CNT1_DAT and CNT2_DAT. When the counter value CNT1_DAT is different from the counter value CNT2_DAT, this indicates that the input voltage VIN is experiencing a power-glitch. Therefore, the control circuit 260 asserts a warning signal PPG_ALARM or NPG_ALARM.

After asserting the warning signal PPG_ALARM or NPG_ALARM, the control circuit 260 uses the control signal CONT to reset the counters 251 and 252 so that the counter value CNT1_DAT and the counter value CNT2_DAT are equal to their initial values, such as 0. Then, the control circuit 260 uses the control signal CONT to direct the counters 251 and 252 so that the counter 251 again adjusts the counter value CNT1_DAT according to the clock signal CK1 and the counter 252 again adjusts the counter value CNT2_DAT according to the clock signal CK2.

In other embodiments, the control circuit 260 determines whether the input voltage VIN is experiencing a power glitch based on the difference between the counter value CNT1_DAT and the counter value CNT2_DAT. For example, when the overflow signal CNT1_OV is asserted, the control circuit 260 determines whether the first difference between the counter value CNT1_DAT and the counter value CNT2_DAT is larger than a first threshold value. When the first difference between the counter value CNT1_DAT and the counter value CNT2_DAT is larger than a first threshold value, this means that the input voltage VIN has been increased by the power glitches. Therefore, the control circuit 260 asserts the warning signal PPG_ALARM. However, when the first difference (CNT1_DAT−CNT2_DAT) is not larger than a first threshold value, this means that the input voltage VIN has not experienced any power glitches even though the input voltage VIN has changed. In one embodiment, a tiny spike causes a change in the input voltage VIN. Therefore, the control circuit 260 does not assert any warning signals PPG_ALARM or NPG_ALARM. At this time, the control circuit 260 resets the counters 251 and 252 to set the counter value CNT1_DAT and CNT2_DAT to an initial value.

In another embodiment, when the overflow signal CNT2_OV is asserted, the control circuit 260 determines whether the second difference between the counter value CNT2_DAT and the counter value CNT1_DAT is larger than a second threshold value. When the second difference (CNT2_DAT−CNT1_DAT) is larger than a second threshold value, this means that the input voltage VIN has been reduced by the power glitch. Therefore, the control circuit 260 asserts the warning signal NPG_ALARM. However, when the second difference (CNT2_DAT−CNT1_DAT) is not larger than a second threshold value, this means that the input voltage VIN has not experienced any power glitches, even though the input voltage VIN has changed. Therefore, the control circuit 260 does not assert the warning signals PPG_ALARM and NPG_ALARM. The control circuit 260 resets the counters 251 and 252.

In some embodiments, the control circuit 260 operates according to the clock signal CK2. In such cases, the clock signal CK2 serves as the operation clock of the control circuit 260. In this embodiment, the oscillation circuit 240, the counters 251 and 252, and the control circuit 260 use the output voltage VOUT as an operation voltage. Therefore, when the input voltage VIN is affected by any attacks, the oscillation circuit 240, the counters 251 and 252, and the control circuit 260 can work normally.

Figure 3:
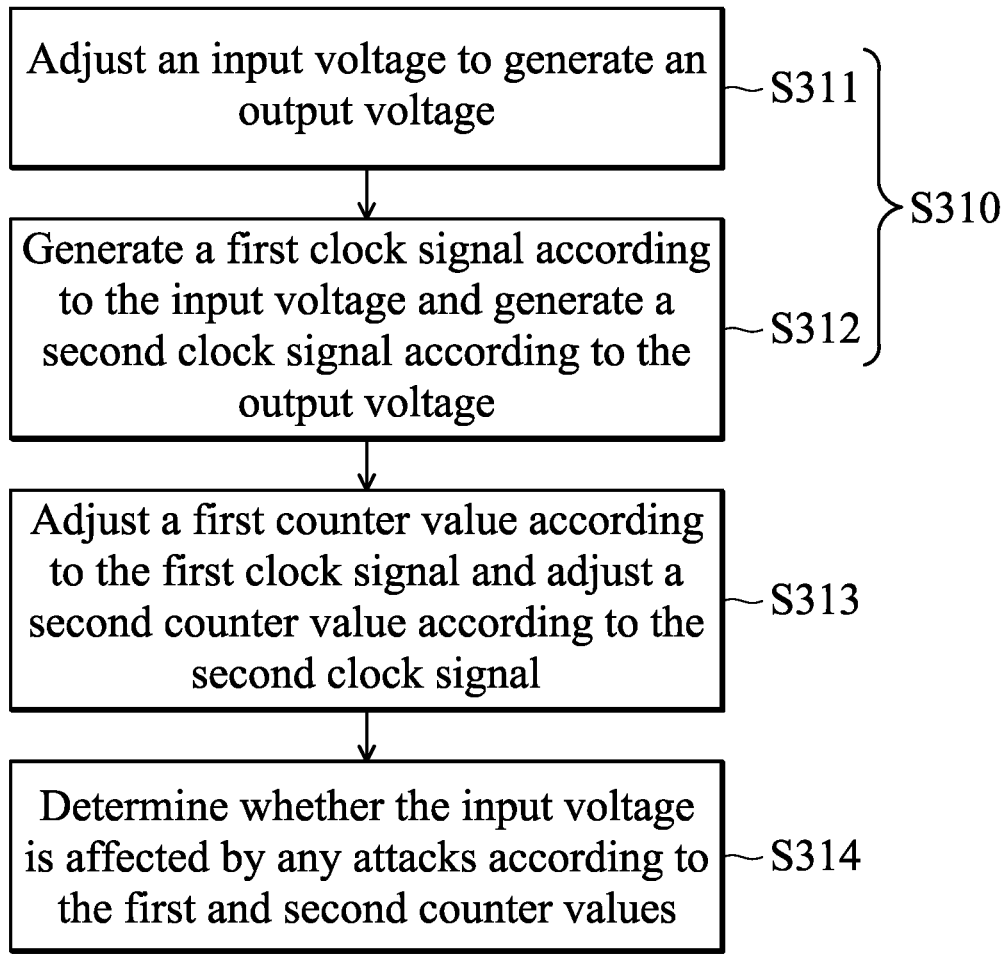
FIG. 3 is a flowchart of an exemplary embodiment of a processing method, according to various aspects of the present disclosure.

FIG. 3 is a flowchart of an exemplary embodiment of a processing method, according to various aspects of the present disclosure. The processing method can be performed by the control circuit 160 of FIG. 1 or the control circuit 260 of FIG. 2 to determine whether an input voltage is affected by any attacks. First, a set operation is performed (step S310). In this embodiment, the set operation comprises steps S311 and S312. Step S311 is to adjust the input voltage to generate an output voltage. In one embodiment, the control circuit 160 of FIG. 1 activates the power protection circuit 120. In such cases, the power protection circuit 120 adjusts the input voltage, and the adjusted input voltage serves as the output voltage.

Next, a first clock signal is generated according to the input voltage and a second clock signal is generated according to the output voltage (step S312). In one embodiment, a first oscillation circuit (e.g., 130 of FIG. 1) generates a first clock signal (e.g., CK1) according to the input voltage, and a second oscillation circuit (e.g., 140 of FIG. 1) generates a second clock signal (e.g., CK2) according to the output voltage. In one embodiment, the control circuit 160 sends a first set signal (e.g., CK1_FREQ_SEL) to the first oscillation circuit to initial the frequency of the first clock signal. In such cases, the control circuit 160 further sends a second set signal (e.g., CK2_FREQ_SEL) to the second oscillation circuit (e.g., 140) to initial the frequency of the second clock signal. In this embodiment, the initial frequency of the first clock signal is the same as the initial frequency of the second clock signal. The structures of the first oscillation circuit and the second oscillation circuit are not limited in the present disclosure. In some embodiments, each of the first oscillation circuit and the second oscillation circuit is a ring oscillator.

A first counter value is adjusted according to the first clock signal and a second counter value is adjusted according to the second clock signal (step S313). In one embodiment, the first and second counter values are provided by a counting circuit. Taking FIG. 1 as an example, the counting circuit 150 may reset the first and second counter values (e.g., CNT1_DAT and CNT2_DAT) according to a control signal CONT so that each of the first and second counter values is equal to its initial value. In other embodiments, the counting circuit 150 stops adjusting the first and second counter values or starts adjusting the first and second counter values according to the control signal.

A determination is made as to whether the input voltage is affected by any attacks according to the first and second counter values (step S314). In one embodiment, when the first counter value is the same as the second counter value, this means that the input voltage has not been affected by any attacks. Therefore, the control circuit may reset the first and second counter values so that each of the first and second counter values is equal to its initial value. However, when the first counter value is different from the second counter value, this indicates that the input voltage has been affected by an attack. Therefore, the control circuit performs a specific operation, such as to assert a warning signal.

In one embodiment, the control circuit starts to read the first and second counter values after an interrupt signal is asserted. In such cases, when the first or second counter value is equal to a predetermined value, the counting circuit stops adjusting the first and second counter values and asserts an interrupt signal. Therefore, the control circuit reads the first and second counter values and determines whether the first counter value is the same as the second counter value. In one embodiment, when the first counter value is larger than the second counter value, this indicates that the input voltage has been experienced an attack, so the input voltage is increased. Therefore, the control circuit asserts a first warning signal. When the first counter value is less than the second counter value, this indicates that the input voltage has been experienced by an attack, so the input voltage is reduced. The control circuit asserts a second warning signal. In other embodiments, the control circuit records the number of times the input voltage is affected by any attacks. Depending on the number of times the input voltage is affected by any attacks, the control circuit may stop all elements from operating.

Figure 4:
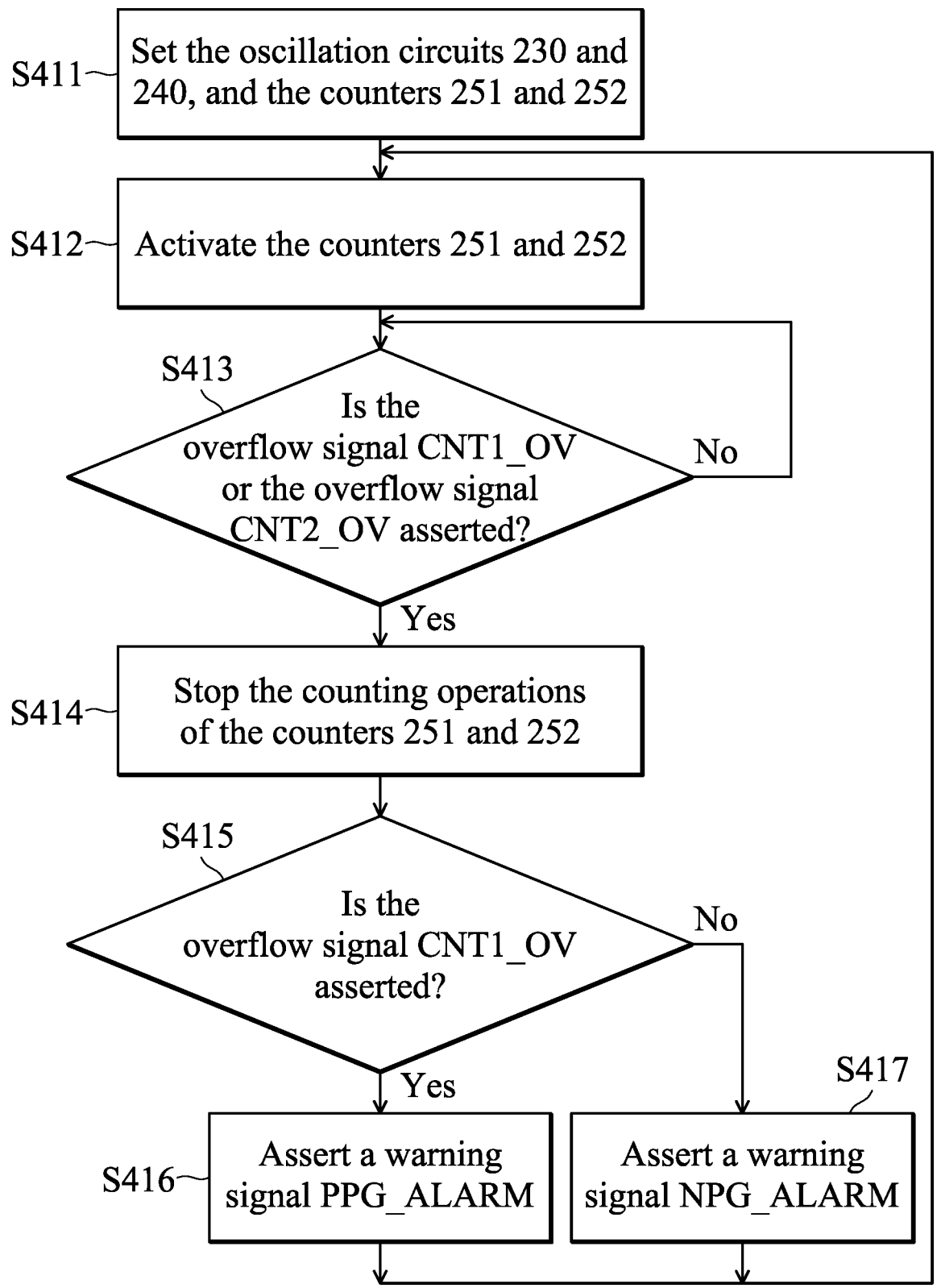
FIG. 4 is a flowchart of another exemplary embodiment of the processing method, according to various aspects of the present disclosure.

FIG. 4 is a flowchart of another exemplary embodiment of the processing method, according to various aspects of the present disclosure. Taking FIG. 2 as an example, the oscillation circuits 230 and 240, and the counters 251 and 252 are set first (step S411). In one embodiment, the control circuit 260 uses the set signals CK1_FREQ_SEL and CK2_FREQ_SEL to initial the frequency of the clock signal CK1 generated by the oscillation circuit 230 and the frequency of the clock signal CK2 generated by the oscillation circuit 240. In some embodiments, the initialed frequency of the clock signal CK1 is the same as the initialed frequency of the clock signal CK2. Additionally, the control circuit 260 uses the set signals CK1_FREQ_SEL and CK2_FREQ_SEL to set the number of bits of the count registers in the counters 251 and 252 to define the upper limits of the counters 251 and 252. In this embodiment, the upper limits of the counters 251 and 252 are the same, such as 6.

The counters 251 and 252 are activated (step S412). In this embodiment, the counter 251 adjusts the counter value CNT1_DAT according to the number of pulses of the clock signal CK1, and the counter 252 adjusts the counter value CNT2_DAT according to the number of pulses of the clock signal CK2. In one embodiment, the counter 251 counts the number of rising edges or falling edges of the clock signal CK1. In such cases, the counter 252 may count the number of rising edges or falling edges of the clock signal CK2.

Then, a determination is made as to whether the overflow signal CNT1_OV of the counter 251 or the overflow signal CNT2_OV of the counter 252 is asserted (step S413). In one embodiment, when the counter value CNT1_DAT reaches a first upper limit, the counter 251 asserts the overflow signal CNT1_OV. Similarly, when the counter value CNT2_DAT reaches a second upper limit, the counter 252 asserts the overflow signal CNT2_OV.

When each of the overflow signals CNT1_OV and CNT2_OV is not asserted, step S413 is performed to count the number of pulses of the clock signal CK1 and the number of pulses of the clock signal CK2. However, when the overflow signal CNT1_OV or CNT2_OV is asserted, the counting operations of the counters 251 and 252 are stopped (step S414). Therefore, the counter 251 stops adjusting the counter value CNT1_DAT, and the counter 252 stops adjusting the counter value CNT2_DAT.

Next, a determination is made as to whether the overflow signal CNT1_OV is asserted (step S415). When the overflow signal CNT1_OV is asserted, this means that the input voltage has been increased due to an attack. Therefore, a warning signal PPG_ALARM is asserted (step S416). In one embodiment, step S416 is performed to reset the counters 251 and 252 so that each of the counter values CNT1_DAT and CNT2_DAT restores to its initial value, such as 0. Step S412 is then performed to count the number of pulses of clock signal CK1 and the number of pulses of clock signal CK2.

However, when the overflow signal CNT1_OV is not asserted, this means that the overflow signal CNT2_OV is asserted. At this time, since the input voltage VIN is reduced due to an attack, a warning signal NPG_ALARM is asserted (step S417). In one embodiment, step S417 further resets the counters 251 and 252 to initial each of the counter values CNT1_DAT and CNT2_DAT into an initial value, such as 0. Then, step S412 is performed to count the number of pulses of the clock signal CK1 and the number of pulses of the clock signal CK2.

Figure 5:
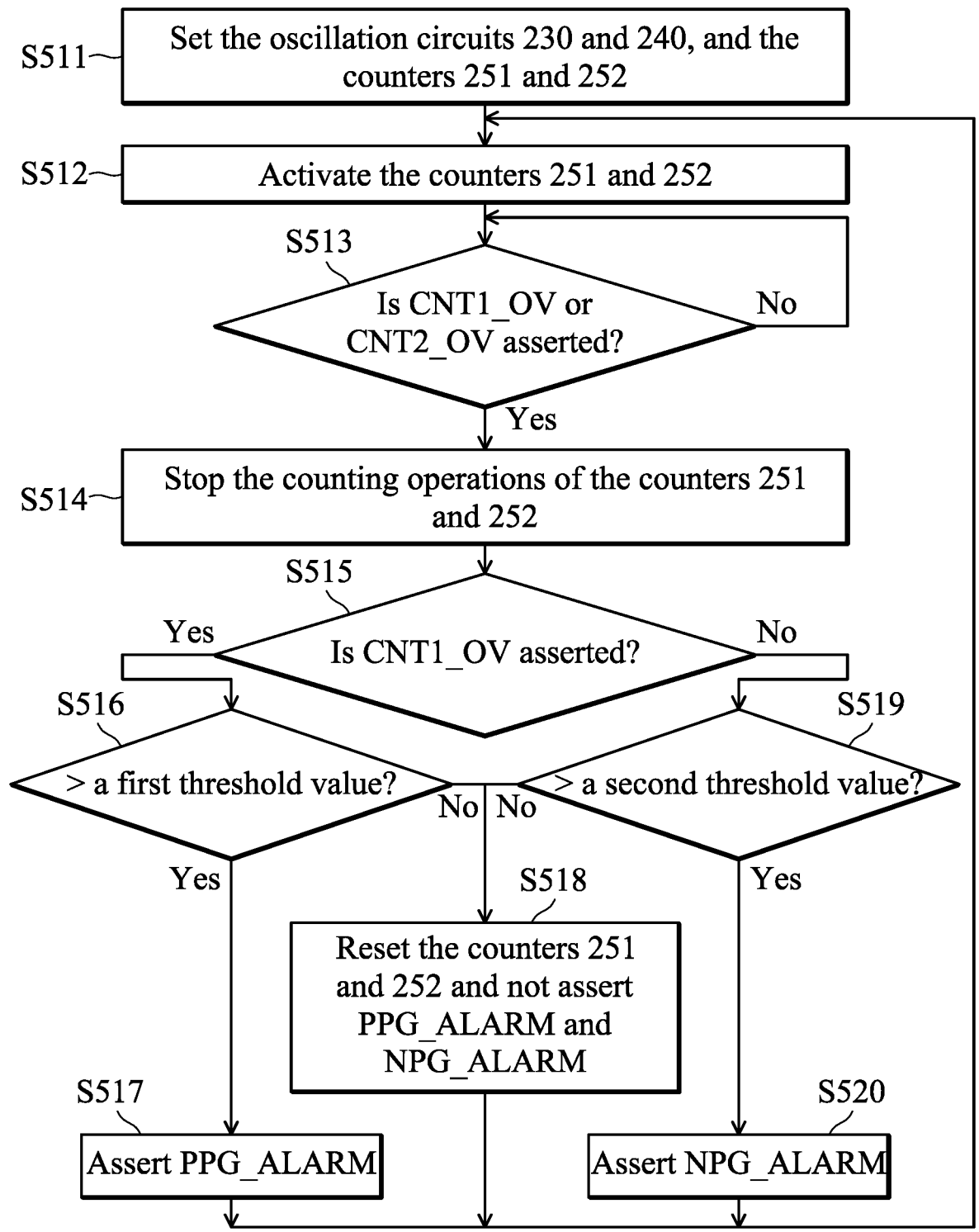
FIG. 5 is a flowchart of another exemplary embodiment of the processing method, according to various aspects of the present disclosure.

FIG. 5 is a flowchart of another exemplary embodiment of the processing method, according to various aspects of the present disclosure. The processing method of FIG. 5 can be performed by the control circuit 260 of FIG. 2. Since the characteristics of steps S511~S515 shown in FIG. 5 are similar to the characteristics of steps S411~S415 shown in FIG. 4, the related description is omitted here Step S515 is to determine whether the overflow signal CNT1_OV is asserted. When the overflow signal CNT1_OV is asserted, the control circuit 260 determines whether the first difference (CNT1_DAT−CNT2_DAT) between the counter values CNT1_DAT and CNT2_DAT is larger than a first threshold value (step S516). When the first difference (CNT1_DAT−CNT2_DAT) is larger than a first threshold value, this means that the input voltage VIN is affected by an attack. Therefore, the warning signal PPG_ALARM is asserted (step S517). In one embodiment, step S517 further resets the counters 251 and 252 so that each of the counter values CNT1_DAT and CNT2_DAT is initialed into an initial value, such as 0. Then, step S512 is performed to count the number of pulses of the clock signal CK1 and the number of pulses of the clock signal CK2. However, when the first difference (CNT1_DAT-CNT2_DAT) is not larger than the first threshold value, this means the input voltage VIN is not being affected by any attacks even though the input voltage has changed. Therefore, the control circuit 260 resets the counters 251 and 252 and does not assert the warning signals PPG_ALARM and NPG_ALARM (step S518).

In step S515, when the overflow signal CNT1_OV is not asserted, this means that the overflow signal CNT2_OV is asserted. Therefore, the control circuit 260 determines whether the second difference (CNT2_DAT-CNT1_DAT) is larger than a second threshold value, this means that the input voltage VIN is reduced and affected by an attack. Therefore, the warning signal NPG_ALARM is asserted (step S520). In one embodiment, step S520 further resets the counters 251 and 252 so that each of the counter values CNT1_DAT and CNT2_DAT is initialed into an initial value, such as 0. Then, step S512 is performed to count the number of pulses of the clock signal CK1 and the number of pulses of the clock signal CK2. However, when the second difference (CNT2_DAT-CNT1_DAT) is not larger than the second threshold value, this means that the input voltage VIN is not being affected by any attacks even though the input voltage is changed. Therefore, the control circuit 260 resets the counters 251 and 252 and does not assert the warning signals PPG_ALARM and NPG_ALARM (step S518).

Processing methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a processing circuit for practicing the methods. The processing methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a processing circuit for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A processing circuit, comprising:
   a first oscillation circuit receiving an input voltage and generating a first clock signal according to the input voltage;
   a second oscillation circuit receiving an output voltage and generating a second clock signal according to the output voltage;
   a counting circuit receiving the output voltage, wherein the counting circuit adjusts a first counter value according to the first clock signal and adjusts a second counter value according to the second clock signal; and
   a control circuit receiving the output voltage and determining whether the input voltage is experiencing an attack according to the first counter value and the second counter value,
   wherein:
      the first oscillation circuit operates in an un-protected power domain, and
      the second oscillation circuit, the counting circuit, and the control circuit operate in a protected power domain.

2. The processing circuit as claimed in claim 1, further comprising:
   a power protection circuit, used for adjusting the input voltage to generate the output voltage.

3. The processing circuit as claimed in claim 1, wherein the power protection circuit is a low dropout linear regulator, and each of the first oscillation circuit and the second oscillation circuit is a ring oscillator.

4. The processing circuit as claimed in claim 1, wherein the control circuit generates a first set signal and provides the first set signal to the first oscillation circuit to set the frequency of the first clock signal, and the control circuit generates a second set signal and provides the second set signal to the second oscillation circuit to set the frequency of the second clock signal.

5. The processing circuit as claimed in claim 1, wherein in response to the first counter value or the second counter value being equal to a predetermined value, the counting circuit asserts an interrupt signal so that the control circuit reads the first counter value and the second counter value.

6. The processing circuit as claimed in claim 5, wherein:
   in response to the first counter value being equal to the predetermined value, the control circuit determines whether a first difference between the first counter value and the second counter value is larger than a first threshold value, and
   in response to the first difference between the first counter value and the second counter value being larger than the first threshold value, the control circuit asserts a first warning signal.

7. The processing circuit as claimed in claim 6, wherein:
   in response to the second counter value being equal to the predetermined value, the control circuit determines whether a second difference between the first counter value and the second counter value is larger than a second threshold value, and
   in response to the second difference between the first counter value and the second counter value being larger than the second threshold value, the control circuit asserts a second warning signal.

8. The processing circuit as claimed in claim 5, wherein the counting circuit comprises:
   a first counter adjusting the first counter value according to the frequency of the first clock signal; and
   a second counter adjusting the second counter value according to the frequency of the second clock signal.

9. The processing circuit as claimed in claim 5, wherein:
   in response to the first counter value being equal to the predetermined value, the first counter asserts the interrupt signal, and
   in response to the second counter value being equal to the predetermined value, the second counter asserts the interrupt signal.

10. The processing circuit as claimed in claim 5, wherein in response to the first counter value or the second counter value being equal to the predetermined value, the control circuit directs the counting circuit to stop adjusting the first counter value and the second counter value.

11. A processing method to determine whether an input voltage is experiencing an attack, comprising:
    providing the input voltage to a first oscillation circuit to generate a first clock signal;
    providing an output voltage to a second oscillation circuit to generate a second clock signal;
    adjusting a first counter value according to the first clock signal;
    adjusting a second counter value according to the second clock signal; and
    determining whether the input voltage is experiencing an attack according to the first counter value and the second counter value,
    wherein the first oscillation circuit operates in an un-protected power domain, and the second oscillation circuit operates in a protected power domain.

12. The processing method as claimed in claim 11, wherein the frequency of the first clock signal is the same as the frequency of the second clock signal.

13. The processing method as claimed in claim 11, further comprising:
    adjusting the input voltage to generate the output voltage.

14. The processing method as claimed in claim 11, further comprising:
    generating a first set signal to the first oscillation circuit to set the frequency of the first clock signal; and
    generating a second set signal to the second oscillation circuit to set the frequency of the second clock signal.

15. The processing method as claimed in claim 11, further comprising:
    determining whether the first counter value or the second counter value is equal to a predetermined value;
    asserting an interrupt signal in response to the first counter value or the second counter value being equal to the predetermined value; and
    reading the first counter value and the second counter value in response to the interrupt signal being asserted.

16. The processing method as claimed in claim 15, further comprising:

determining whether a first difference between the first counter value and the second counter value is larger than a first threshold value in response to the first counter value being equal to the predetermined value;

determining whether a second difference between the first counter value and the second counter value is larger than a second threshold value in response to the second counter value being equal to the predetermined value; and in response to the first difference being larger than the first threshold value or the second difference being larger than the second threshold value, this means that the input voltage is experiencing the attack.

17. The processing method as claimed in claim 16, further comprising:

asserting a first warning signal in response to the first difference being larger than the first threshold value; and asserting a second warning signal in response to the second difference being larger than the second threshold value.

18. The processing method as claimed in claim 15, wherein the step of adjusting the first counter value according to the first clock signal comprises:

providing the first clock signal to a first counter so that the first counter adjusts the first counter value according to the number of pulses of the first clock signal, wherein in response to the first counter value being equal to the predetermined value, the interrupt signal is asserted by the first counter.

19. The processing method as claimed in claim 18, wherein the step of adjusting the second counter value according to the second clock signal comprises:

providing the second clock signal to a second counter so that the second counter adjusts the second counter value according to the number of pulses of the second clock signal, wherein in response to the second counter value being equal to the predetermined value, the interrupt signal is asserted by the second counter.

20. The processing method as claimed in claim 19, wherein in response to the first counter value or the second counter value being equal to the predetermined value, the first counter stops adjusting the first counter value and the second counter stops adjusting the second counter value.

\* \* \* \* \*